_United States Patent Office_ 2,715,132
Patented Aug. 9, 1955

2,715,132

UNSATURATED FATTY ACID ESTERS OF ALLOXY HYDROXYBUTENES

Daniel Swern, Philadelphia, Pa., assignor to the United States of America as represented by the Secretary of Agriculture No Drawing. Application December 12, 1952,
Serial No. 325,740

6 Claims. (Cl. 260—410.6)

(Granted under Title 35, U. S. Code (1952), sec. 266)

An irrevocable, non-exclusive, royalty-free license in the invention herein described, for all governmental purposes, throughout the world, with power to grant sub-licenses for such purposes, is hereby granted to the Government of the United States of America.

This invention relates to alloxy butenyl esters of unsaturated fatty acids having the formula

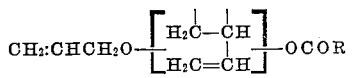

where R is straight-chain aliphatic hydrocarbon radical having at least 11 carbon atoms and at least one olefinic double bond. As is indicated by the formula, the positions of the alloxy and the fatty acid groups are uncertain; my products are believed to be mixtures of the two indicated isomers.

An object of this invention is to provide novel esters of unsaturated fatty acids. Another object is to provide new polymerizable monomers useful for making plastics, drying oils and synthetic resins. Still another object is to provide unsaturated compounds suitable for conversion to plasticizers and resin intermediates by epoxidation.

I have discovered that alloxy hydroxybutenes, suitably prepared as described by Swern et al., J. Am. Chem. Soc., 71, 1152 (1949), may be esterified with unsaturated fatty acids. The resulting esters may be polymerized, by conventional methods for free radical polymerizations, to yield solid or viscous liquid polymers useful for surface coatings and as softeners and plasticizers for other polymeric materials.

My novel esters are especially suited for epoxidation by the processes described by Swern and Findley in U. S. Patents 2,567,930 and 2,569,502 and the epoxidized products are especially suitable for use as plasticizers and stabilizers for vinyl resins.

The preparation of my novel esters is illustrated by the following examples.

*Example I*

A mixture of 27 g. of alloxy hydroxybutenes and 56 g. of 80% linolenic acid, iodine number 238 (obtained from perilla oil fatty acids), was refluxed at 100 mm. pressure for 17 hours in a stream of nitrogen. The reaction temperature was initially 155° C., but rose slowly to 215°–220° C. after 6 hours, at which time the temperature remained substantially constant for the rest of the reaction period. The temperature of the condenser was maintained at about 50°–55° C., so that the water liberated as a result of esterification was removed as vapor, while the alloxy hydroxybutenes were condensed and returned to the reaction mixture. The resulting product consisting essentially of the linolenic acid ester of the alloxy hydroxybutenes, obtained in quantitative yield, was a pale yellow oil, acid number 10; saponification number, 158.3; iodine number, 274.5.

*Example II*

The esterification procedure of Example I was repeated using 56 g. of 90% linoleic acid, iodine number 170.2 (obtained from tobacco seed oil fatty acids) and 28.2 g. of alloxy hydroxybutenes as the reactants. Reaction time was 31 hours. The resulting product consisting essentially of the linoleic acid ester of alloxy hydroxybutenes, obtained in quantitative yield, was a pale yellow oil, acid number 11, saponification number, 154.2; iodine number, 235.2.

*Example III*

The esterification procedure of Example I was repeated using 56.5 g. of 100% oleic acid (obtained from olive oil fatty acids) and 28.2 g. of alloxy hydroxybutenes as the reactants. Reaction time was 24 hours. The resulting product consisting essentially of the oleic acid ester of alloxy hydroxybutenes, obtained in quantitative yield, was a pale yellow oil, acid number 16; saponification number, 154.4; iodine number, 174.0.

The products of Examples I–III are polymerizable monomeric substances possessing properties which render them useful as components and modifying agents in the production of synthetic plastic, coating and impregnating compositions formed by polymerization of monomeric compounds, or containing the polymerized products derived from such monomers.

Products having similar properties as the esters of the foregoing examples are also obtained by analogous esterification procedures, using in place of the linoleic, linolenic and oleic acid of these examples, equivalent amounts of mono and polyunsaturated olefinic fatty acids derived from other sources and containing from about 50 to about 100 percent by weight of the pure linoleic, linolenic or oleic acid.

In general the esterification procedures utilized in the production of the alloxy hydroxybutene esters of this invention are also applicable to the production of the corresponding esters of other unsaturated fatty acids, particularly undecylenic acid, ricinoleic acid, eleostearic acid, elaidic acid, dehydrated castor oil acids, fish oil acids, and in general, any unsaturated fatty acids containing 11 or more carbon atoms, or mixtures containing such acids.

I claim:

1. An unsaturated fatty acid ester of alloxy hydroxybutene.

2. A composition consisting essentially of esters having the formula

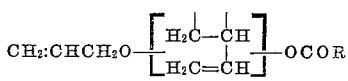

where R is a straight chain aliphatic hydrocarbon radical having at least 11 carbon atoms and containing at least one olefinic double bond.

3. A composition as in claim 2 wherein R contains 17 carbon atoms.

4. A composition as in claim 2 wherein RCOO— represents the oleyl radical.

5. A composition as in claim 2 wherein RCOO— represents the linoleyl radical.

6. A composition as in claim 2 wherein RCOO— represents the linolenyl radical.

References Cited in the file of this patent

UNITED STATES PATENTS 2,576,268   Shugar et al. _____ Nov. 27, 1951

OTHER REFERENCES

Swern et al., J. Am. Chem. Soc., 71 (1949), 1152.